US010262378B2

(12) United States Patent
Roberts et al.

(10) Patent No.: US 10,262,378 B2
(45) Date of Patent: Apr. 16, 2019

(54) TRANSACTION IDENTIFICATION AND RECOGNITION

(71) Applicant: MasterCard International Incorporated, Purchase, NY (US)

(72) Inventors: David A. Roberts, Warrington (GB); Patrik Smets, Nijlen (BE); Patrick Mestré, Sart-Bernard (BE); Ian Maddocks, Milton Keynes (GB)

(73) Assignee: Mastercard International Incorporated, Purchase, NY (US)

( * ) Notice: Subject to any disclaimer, the term of this patent is extended or adjusted under 35 U.S.C. 154(b) by 260 days.

(21) Appl. No.: 14/683,549

(22) Filed: Apr. 10, 2015

(65) Prior Publication Data

US 2015/0317748 A1      Nov. 5, 2015

(30) Foreign Application Priority Data

Apr. 14, 2014  (GB) .................................. 1406686.4

(51) Int. Cl.
*G06Q 40/00*   (2012.01)
*G06Q 20/12*   (2012.01)
*G06Q 20/34*   (2012.01)

(52) U.S. Cl.
CPC ............. *G06Q 40/12* (2013.12); *G06Q 20/12* (2013.01); *G06Q 20/34* (2013.01)

(58) Field of Classification Search
USPC .......................................................... 705/30
See application file for complete search history.

(56) References Cited

U.S. PATENT DOCUMENTS

| 2007/0156583 | A1  | 7/2007 | Ripp et al. |
| 2014/0180826 | A1* | 6/2014 | Boal ................... G06Q 30/0245 705/14.66 |
| 2015/0032636 | A1* | 1/2015 | Wedekind ............ G06Q 20/204 705/76 |

OTHER PUBLICATIONS

"Patents Act 1977: Report under Section 17(5)(b) Search Report", Oct. 8, 2014, United Kingdom Intellectual Property Office, for GB Application No. 1406686.4, 6pgs.

(Continued)

*Primary Examiner* — Garcia Ade
(74) *Attorney, Agent, or Firm* — Buckley, Maschoff & Talwalkar LLC

(57) ABSTRACT

A method of matching transaction data with a transaction receipt using one of a plurality of transaction-specific elements is described. Transaction-specific elements are determined (210) from a transaction between a payment token of a user and a terminal. Transaction identifiers are then formed (220), each from a separate transaction-specific element. At least one of the transaction identifiers is then received or generated (230) in a transaction processing system. The transaction processing system provides transaction data associated with this transaction identifier. Each of the transaction identifiers used by the transaction processing system is combined (240) to form a composite transaction identifier comprising a plurality of transaction identifier elements. Each transaction identifier is matched (250) against each transaction identifier element to identify the transaction and to associate the transaction data with a transaction receipt. This approach is particularly effective for use in providing receipts for contactless card transactions. A terminal, a mobile computing device, a receipt service and a transaction processing system are also described.

8 Claims, 5 Drawing Sheets

(56) References Cited

OTHER PUBLICATIONS

"EMV Contactless Specifications for Payment Systems: Book A Architecture & General Requirements", Version 2.5, Mar. 2015, EVMCO, downloaded from http://www.emvco.com/specifications.aspx, 116pgs.

Canadian Office Action dated Aug. 1, 2017 for Application No. 2,945,601, 5 pp.

* cited by examiner

TRANSACTION IDENTIFICATION AND RECOGNITION

CROSS-REFERENCE TO RELATED APPLICATION

This application is a U.S. National Stage filing under 35 U.S.C. § 119, based on and claiming benefit of and priority to GB Patent Application No. 1406686.4 filed Apr. 14, 2014.

FIELD OF DISCLOSURE

This disclosure relates generally to transaction identification and recognition. In aspects, it relates particularly to recognition of transactions in a system where it is not certain whether specific transaction data will be provided to the system. This is particularly relevant to the provision of electronic receipts for transactions, particularly contactless mag stripe transactions.

BACKGROUND OF DISCLOSURE

Payment cards such as credit cards and debit cards are very widely used for all forms of financial transaction. The use of payment cards has evolved significantly with technological developments over recent years. Many payments are made at a retail location, typically with a physical transaction card interacting with a point of sale (POS) terminal to perform a transaction. These transaction cards may interact with a POS by swiping through a magnetic stripe reader, or for a "chip card" or "smart card" by direct contact with a smart card reader (under standard ISO/IEC 7816) or by contactless interaction through local short range wireless communication (under standard ISO/IEC 14443).

In Europe, contactless cards generally operate under the EMV standard for interoperation of chip cards and associated apparatus provided and maintained by EMVCo. In other areas such as the USA, contactless cards exist, but operate under a different set of protocols. In the USA, a "contactless mag-stripe" protocol is used which utilises aspects of the existing protocol used in reading of a transaction card magnetic stripe by a card reader, but modified to avoid replay attack risks by inclusion of dynamic data. This contactless mag-stripe protocol is described in more detail in the EMV Contactless Specifications for Payment Systems, available from https://www.emvco.com/specifications.aspx?id=21.

It is increasingly desirable for consumers to obtain and manage electronic receipts for card transactions. When making a payment at a point of sale (POS) terminal, it would be desirable for this to take place directly without an additional intervention (such as the capture of a customer e-mail address by the merchant) and in such a way that the customer could easily match payment data and receipt data. As payment data and receipt data are typically handled by different systems, a logical mechanism to achieve this is to find a transaction identifier that will allow data from the two systems to be matched to determine when each is referring to the same transaction.

This is particularly problematic where a transaction does not contain a single reliable identifier that will remain intact throughout any system using data from that transaction. Contactless mag stripe transactions do contain information suitable for use as a reliable identifier, but this information does not necessarily remain intact through all systems using the data from the transaction. This is because in a contactless mag stripe transaction, the best identifying data comprises the two dynamically modified contactless mag stripe tracks, Track 1 and Track 2. For example, in a MasterCard PayPass implementation, Track 1 and Track 2 are modified in the course of a transaction with an Unpredictable Number (UN) provided by the contactless reader and with a payment application's transaction counter and a dynamic cryptogram. The Track 1 and Track 2 data, as modified by the contactless reader, are each capable of providing a transaction identifier for a transaction, but will not be reliably passed through the payment infrastructure associated with the transaction. This is because when seeking authorisation for the transaction, the POS terminal will pass on at least one of Track 1 and Track 2, but may not pass on both because of messaging space constraints.

It is desirable in systems like this to find a way of maintaining the integrity of data through identifying transactions so that they can be reconciled even if it is not possible to identify specific transaction-identifying data that will be maintained reliably throughout systems handling transaction data.

SUMMARY OF DISCLOSURE

In a first aspect, the disclosure provides a method of matching transaction data with a transaction receipt using one of a plurality of transaction-specific elements, the method comprising: determining from a transaction between a payment token and a terminal a plurality of transaction-specific elements, and forming a plurality of transaction identifiers each from a separate transaction-specific element; enabling at least one of the plurality of transaction identifiers to be received or generated in a transaction processing system, wherein the transaction processing system provides transaction data associated with said at least one of the plurality of transaction identifiers; combining each of the plurality of transaction identifiers used by the transaction processing system to form a composite transaction identifier comprising a plurality of transaction identifier elements; and matching each transaction identifier against each transaction identifier element to identify the transaction and to associate the transaction data with a transaction receipt.

This approach enables effective use of the transaction identifiers to ensure that transaction data can be associated with a transaction receipt even where the transaction data and transaction receipt are provided by different systems and even where at least one transaction identifier may be missing or even incorrect in one of the systems.

It can also be used even when there is limited room available for the composite transaction identifier. In particular embodiments, combining each of the plurality of transaction identifiers comprises truncating each of the plurality of transaction identifiers, and each transaction identifier element is a truncated transaction identifier. The composite transaction identifier may then be a concatenation of the transaction identifier elements.

Each transaction identifier may comprise an output of a hash function, wherein the transaction-specific element is an input to the hash function. The hash function may be an SHA256 hash function, for example.

In embodiments, the terminal provides the at least one of the plurality of transaction-specific elements to a transaction processing system.

In embodiments, the transaction processing system forms the composite transaction identifier and provides the composite transaction identifier to the user or to a receipt service.

This aspect of the disclosure has particular value when the user has a payment device and the terminal is a merchant device. This payment device may be, or may emulate, a contactless payment card, and in particular embodiments it may be, or may emulate, a contactless mag-stripe card.

In a second aspect, the disclosure provides a method of providing receipts for contactless payment card transactions, comprising: a user conducting a contactless payment card transaction with a terminal; and the user matching transaction data with a transaction receipt as described above; whereby the merchant provides receipt information and the plurality of transaction identifiers to a receipt service which provides the transaction receipt, and wherein the composite transaction identifier is used to obtain the receipt for the transaction from the receipt service.

In embodiments, the step of matching each transaction identifier against each transaction identifier element to identify the transaction is carried out by the receipt service.

In embodiments, the user has a mobile computing device. In this case, the step of matching each transaction identifier against each truncated transaction identifier to identify the transaction may be carried out by the mobile computing device. The he mobile computing device may for example comprise a digital wallet.

In a third aspect, the disclosure provides a terminal adapted to facilitate matching transaction data with a transaction receipt using one of a plurality of transaction-specific elements, wherein the terminal is adapted to: determine from a transaction between a payment token and the terminal a plurality of transaction-specific elements, and form a plurality of transaction identifiers each from a separate transaction-specific element; provide at least one of the plurality of transaction-specific elements or transaction identifiers to a transaction processing system; and provide each of the plurality of transaction identifiers to a receipt service for matching against the at least one of the transaction identifiers either provided to the transaction processing system, or generated from the at least one of the plurality of transaction-specific elements provided to the transaction processing system.

In embodiments, the terminal is a merchant device adapted for conducting a transaction with a payment device. Such a terminal may be adapted for conducting a contactless mag-stripe transaction.

In a fourth aspect, the disclosure provides a receipt service for providing a transaction receipt to a user, the receipt service being adapted to: receive receipt information for and a plurality of transaction identifiers from a terminal, wherein the receipt information and the plurality of transaction identifiers relate to a transaction between a payment token and a terminal, wherein each of the plurality of transaction identifiers is derived from a transaction-specific element determined from the transaction; prepare a transaction receipt associated with the plurality of transaction identifiers; and provide the transaction receipt to the user on determining that one of the transaction identifiers has been provided.

In certain embodiments, the receipt service is adapted to receive one of the plurality of transaction identifiers to the user, by which the receipt service determines that one of the transaction identifiers has been provided.

In other embodiments, the receipt service receives a composite transaction identifier comprising a plurality of transaction identifier elements from the user, and wherein the receipt service determines that one of the transaction identifiers has been provided by matching each transaction identifier against each transaction identifier element.

In a fifth aspect, the disclosure provides a mobile computing device comprising a processor and a memory, wherein the processor is programmed to operate a digital wallet, wherein the digital wallet is adapted to receive transaction data and an associated composite transaction identifier from a payment infrastructure, wherein the composite transaction identifier comprising a plurality of transaction identifier elements associated with a transaction, and wherein the digital wallet is adapted to obtain from a receipt service a transaction receipt for the transaction using the composite transaction identifier.

In embodiments, the mobile computing device also possesses transaction identifiers derived from the transaction, and matches the transaction identifiers against the transaction identifier elements to provide the transaction identifiers to the receipt service.

In particular embodiments, the mobile computing device is also a payment device, and the mobile computing device also comprises a cardlet.

In embodiments, the mobile computing device is or comprises a mobile terminal of a cellular telecommunications system.

In a sixth aspect, the disclosure provides a transaction processing system adapted to receive from a merchant transaction details for authorisation of a transaction, the transaction details comprising or enabling generation of one or more transaction identifiers from a plurality of transaction identifiers derived from transaction-specific elements associated with the transaction when the transaction is made, wherein the transaction processing system is adapted if more than one transaction identifier is received or generated to form a composite transaction identifier by combining each of the plurality of transaction identifiers used by the transaction processing system to form a composite transaction identifier comprising a plurality of transaction identifier elements, and to provide transaction data together with the composite transaction identifier.

BRIEF DESCRIPTION OF FIGURES

Embodiments of the disclosure will now be described, by way of example, with reference to the accompanying Figures, of which.

DESCRIPTION OF SPECIFIC EMBODIMENTS

Specific embodiments of the disclosure will be described below with reference to the Figures.

Figure 1:
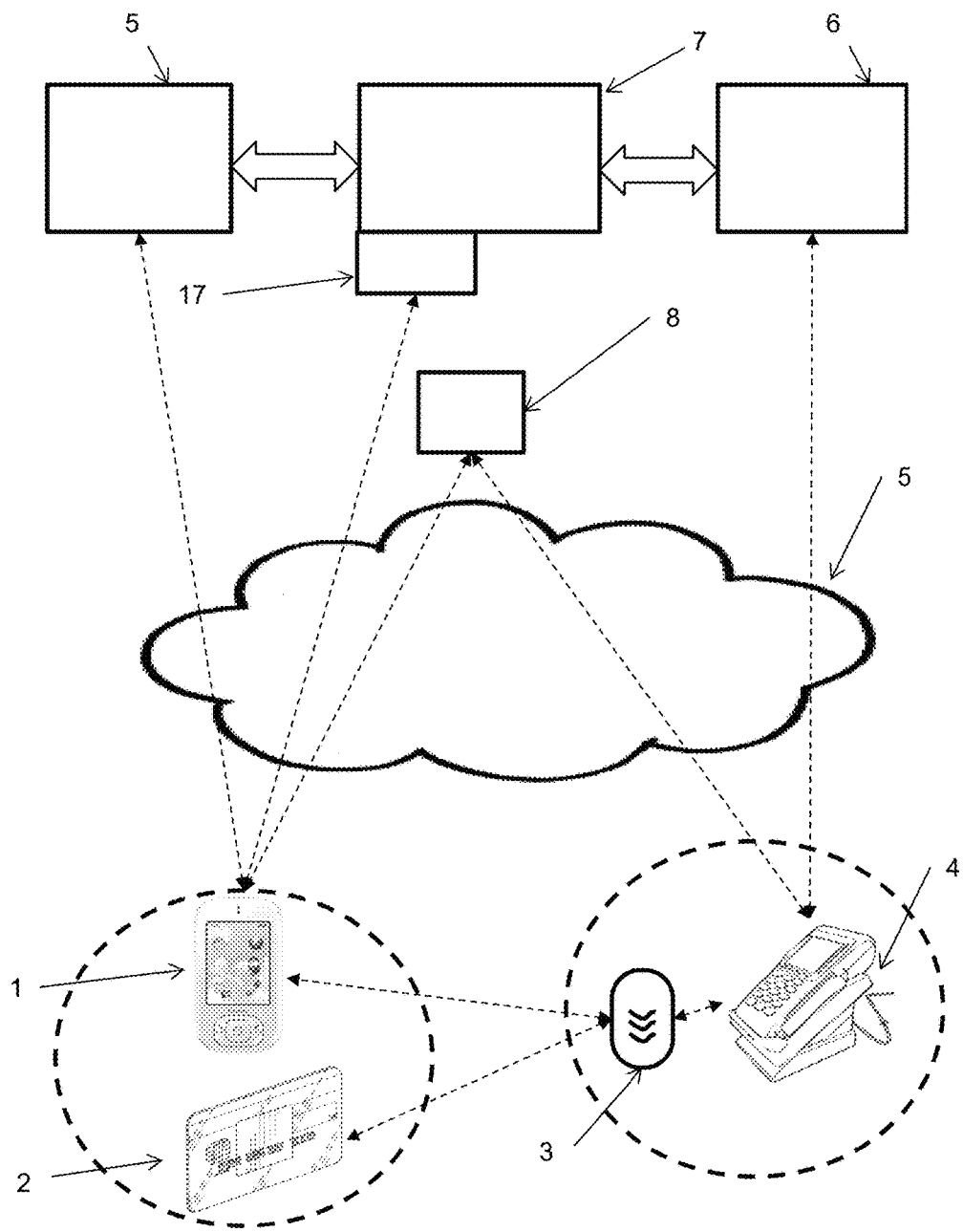
FIG. 1 shows elements of a system suitable for carrying out embodiments of the disclosure.

FIG. 1 shows schematically relevant parts of a representative transaction system suitable for implementing an embodiment of the disclosure.

A user (not shown) is provided with a payment device—this may be for example a payment card 2, but in particular embodiments it may be a computing device used as a proxy for a payment card (such as a mobile phone 1). Mobile phone 1 is also shown as the mechanism for the user to interact with other elements of the system over a suitable network 5—network 5 here represents any appropriate communication network for the communication path indicated, and may be the public internet, a cellular communications network or a private network, depending on the parties involved in the communication and the need for the communication path to be secure.

The payment device is adapted to use a contactless protocol for communication with a point of interaction (POI) terminal such as a point of sale (POS) terminal or an automated teller machine (ATM). The payment card 2 must therefore include a chip and a wireless transmitter and receiver adapted for short range communication by protocols such as those defined under ISO/IEC 14443—if used as a payment device, the mobile phone 1 (which will typically be adapted to implement short range communication under the NFC standard) must have similar capability and an appropriate payment application installed. The terminal 4 must be provided with a reader 3 for contactless transactions, the terminal 4 and the reader 3 together providing in this case a POS system for a merchant. The operation of this system is described further below with reference to FIG. 3.

There may also be a mechanism to allow connection between the user computer devices and a card issuing bank 5 or system associated with the user. A banking infrastructure 7 will also connect the card issuing 5 and the merchant's transaction acquiring bank 6, allowing transactions to be carried out between them. This banking infrastructure will typically be provided by a transaction card provider who provides transaction card services to the card issuing bank 5. The banking infrastructure 7 provides authorization at the time of purchase, clearing of the transaction and reconciliation typically within the same working day, and settlement of payments shortly after that. The banking infrastructure 7 comprises a plurality of switches, servers and databases, and is not described further here as the details of the banking infrastructure used are not necessary for understanding how embodiments of the disclosure function and may be implemented, save to note that associated with the banking infrastructure 7 is a digital enablement service 17 adapted to support digital transaction data and electronic or digital wallets. In embodiments discussed below, mobile phone 1 comprises a digital wallet application used for purposes including management of transactions and digital receipts.

Another system element is electronic receipt service 8, which is shown here as independent of the banking infrastructure 7 (in other embodiments this may be a part of the banking infrastructure 7, or may have a special trusted relationship with it). The electronic receipt service 8 receives transaction information directly or indirectly (for example, through a merchant computer) from the terminal 4, and provides electronic receipts to the user through a suitable computing device, which in the case shown in mobile phone 1.

Figure 3:
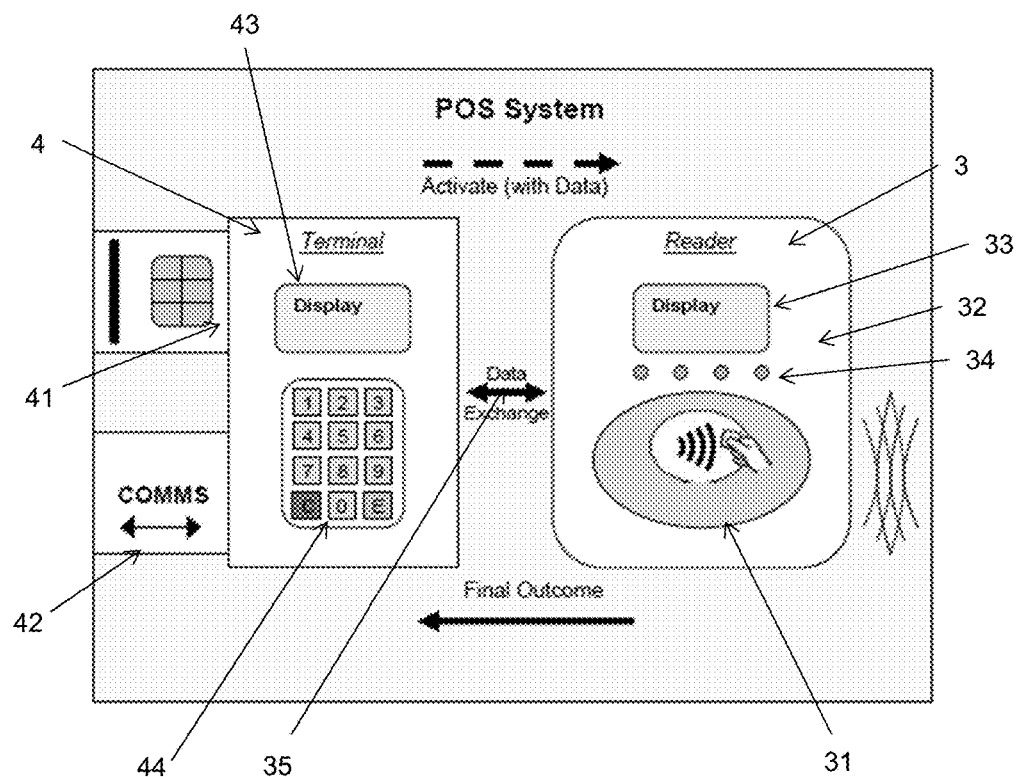
FIG. 3 shows a conventional POS system adapted for contactless transactions.

The elements of a contactless transaction will now be described with reference to FIG. 3, which illustrates the interaction between the reader 3 and the terminal 4—the payment device is not explicitly shown. The reader 3 comprises a wireless communication interface 31 for wireless communication with the payment device, and a cardholder side user interface 32 including here a reader display 33 and signal lights 34. The reader also has a data communication path 35 to the terminal 4—this may be a wired connection or a wireless communication over a suitable local communication network (this may be secured to prevent effective eavesdropping). The terminal 4 is here a conventional POS terminal augmented by ability to communicate with the reader 3—it therefore comprises a reader interface 41 for interacting with other payment device types by contact (chip cards, magnetic stripes), a communication interface 42 for communicating directly or indirectly with a merchant's acquiring bank, and a user interface including a display 43 and a keypad 44 for use by merchant or customer as appropriate to the transaction.

A contactless transaction may be initiated by the merchant at the terminal 4 or by a payment device coming into range of the wireless communication interface 31 if a transaction is expected. The terminal 4 provides the reader 3 with sufficient details of the transaction and of the terminal to allow a transaction to take place between the two. The transaction follows protocols set out in the EMV Contactless Specifications for Payment Systems. The transaction amount is displayed to the customer on the reader display 33. The reader 3 provides sufficient information to the payment device to identify the transaction and the merchant and to provide confidence to the cardholder that the transaction is legitimate. The payment device provides sufficient information to identify the relevant cardholder account to the merchant, and to allow the merchant to authorise the transaction with the merchant's acquiring bank (this may be considered to be a payment token provided by the payment device to indicate the user's commitment to the transaction)—authorisation may or may not be required during the transaction, depending on factors such as the size of the transaction. Included in this information provided by the payment device is verification information which can be used to formulate a transaction identifier—this will be discussed further below in the context of mag-stripe and EMV contactless transactions. The reader 3 determines a final outcome for the transaction, which is then communicated to the terminal 4 and also to the payment device.

Figure 2:
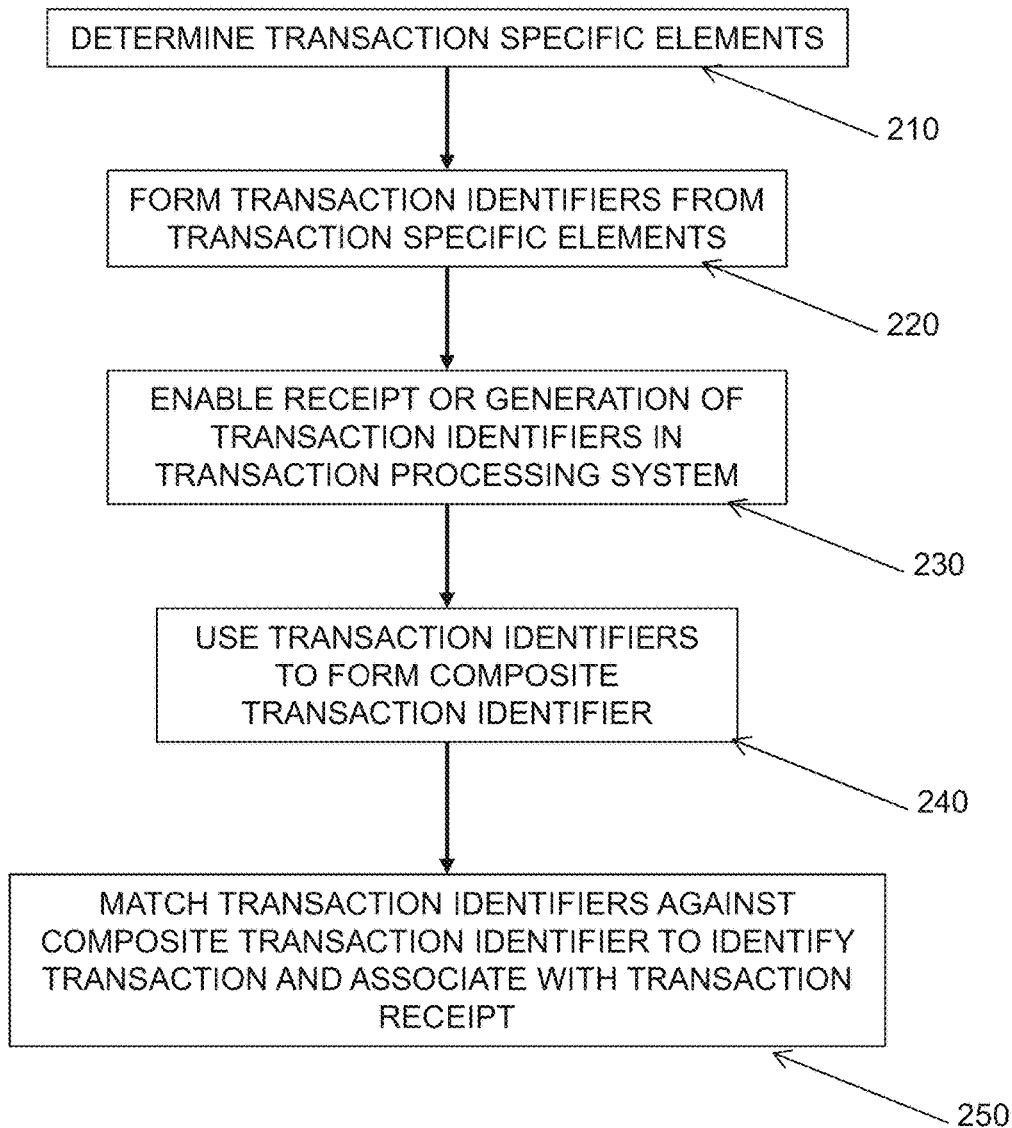
FIG. 2 shows a process flow for an aspect of the disclosure.

A general embodiment of the disclosure is described with reference to FIG. 2. This embodiment is applicable to a variety of transaction types, and while it is particularly useful for contactless mag-stripe transactions for reasons discussed further below, it is not limited in its application to this technical context. Embodiments of the disclosure may be used for transactions which are not payments—for example, in the provision of credentials to obtain an item associated with those credentials, such as a digital permission or security pass.

Firstly, a number of transaction specific elements are generated (step 210). Each of these elements is then used to generate a transaction identifier (step 220)—these transaction identifiers may be the transaction specific elements themselves, or may be derived from the transaction specific elements in an agreed or well-understood way (for example, by use of a publicly available algorithm). One or more of the transaction specific elements is then provided (step 230), along with any further details of the transaction that are needed for it to be processed, to a transaction processing system—alternatively one or more transaction identifiers could be provided to the transaction processing system, but in either event the transaction processing system will receive or can generate the transaction identifiers associated with some or all of the original transaction identifiers. The transaction identifiers are not however simply provided to the transaction processing system, but elements of them (such as a truncated form of an identifier, or even whole identifiers) are merged together to form a composite transaction identifier (step 240), for example by concatenation. The composite transaction identifier contains sufficient information from each of the transaction identifiers that it is possible to match transaction identifiers against the composite transaction identifier to identify the transaction (step 250). This identification can then be used to recover transaction details from the transaction processing system—these may for example be provided to a user with the composite transaction identifier. The transaction details may then be, for example, reconciled with a transaction receipt provided by a separate service under one or more of the original transaction identifiers.

Figure 4:
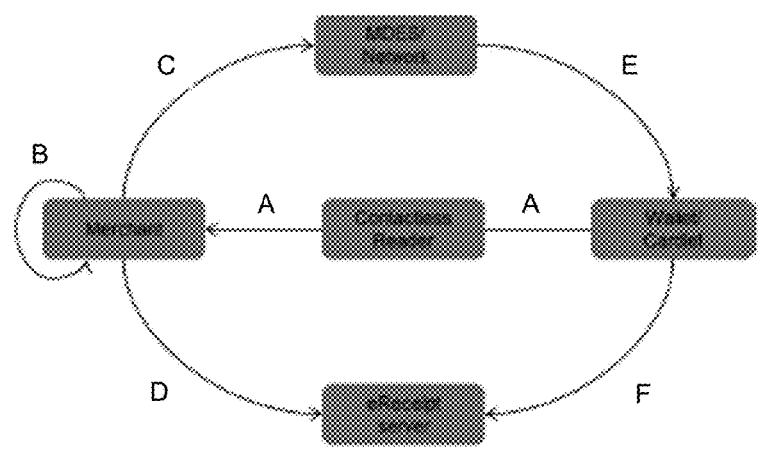
FIG. 4 represents relevant system components for a receipted contactless mag-stripe transaction in accordance with an embodiment of the disclosure.
Figure 5:
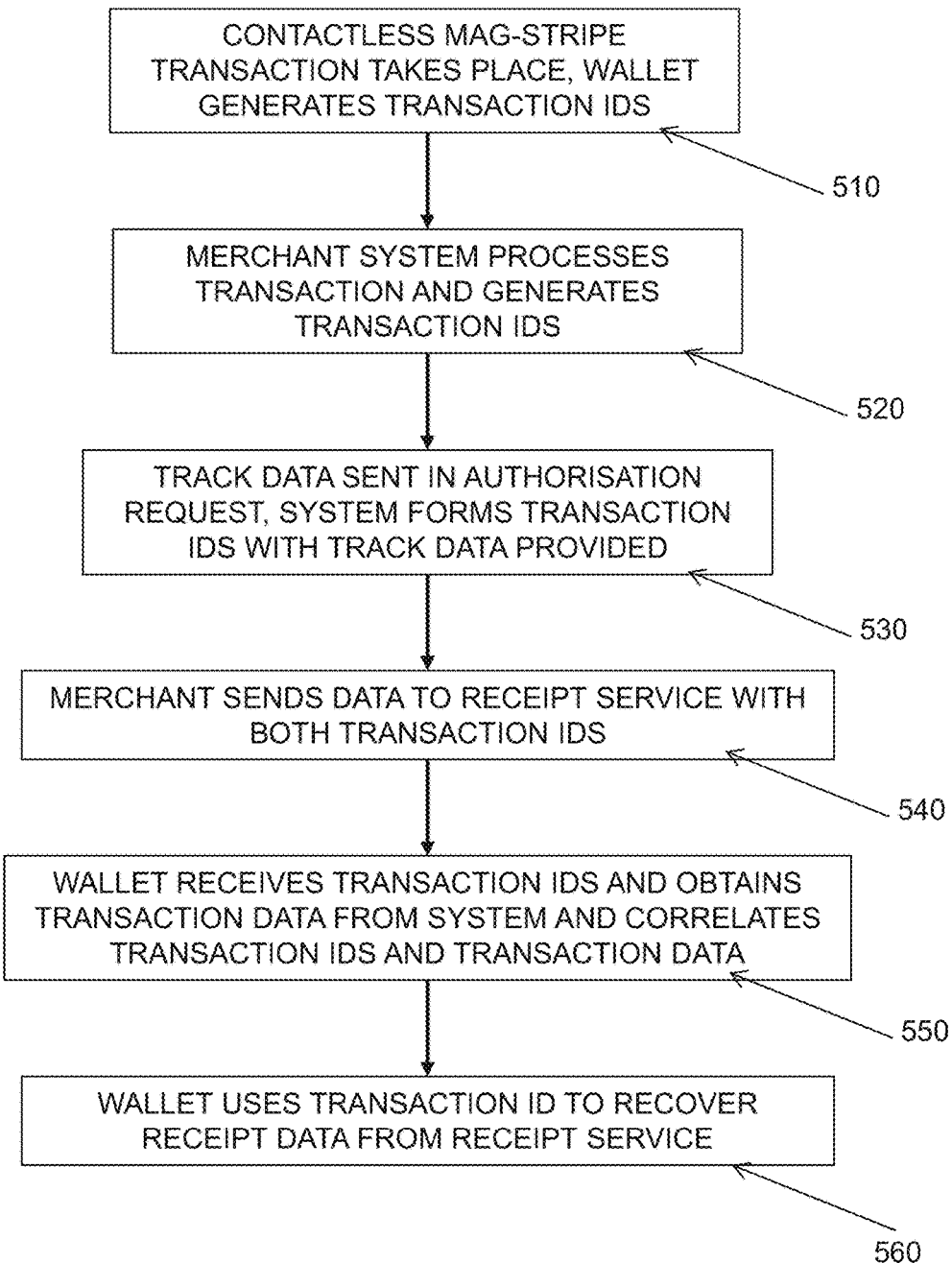
FIG. 5 shows a process flow for a contactless mag-stripe transaction in accordance with an embodiment of the disclosure.

The application of this approach to the creation of an electronic receipt for a contactless mag-stripe transaction in an embodiment of the disclosure is described below with reference to FIGS. 4 and 5 of the accompanying Figures. FIG. 4 indicates the transaction flow between the different elements involved in the transaction and receipting process, whereas FIG. 5 describes specific steps in the context of a contactless mag-stripe transaction.

First of all, the contactless mag-stripe transaction takes place in a conventional way (A in FIG. 4, 510) between the payment device—here implemented on a computing device as a digital wallet (essentially a payment application on a mobile phone, providing a user interface for the cardholder) and a cardlet (Java or other code emulating a smart card on the mobile phone and interacting with the digital wallet), though implementation using a contactless card is also possible. The cardlet provides mag-stripe data to the reader in the form of two tracks, Track 1 and Track 2. These tracks contain discretionary fields according to the EMV Contactless Specifications and this may be populated by the reader to provide transaction-specific track values. For example, the discretionary fields may be populated by digits from the Unpredictable Number generated by the terminal or reader (as further described in EMV specifications), by a transaction counter from the payment application, and from a cardholder verification code (CVC) embedded in the track data (this may be implemented so that the location of the CVC within track data is not publicly known and not disclosed to the terminal—limited knowledge of this positional information helps it to be used effectively by the card issuer for verification and authorisation). The track data, as finally constructed, is therefore dynamic—the relevant discretionary data is however shared between the reader and the cardlet so that both can construct Track 1 and Track 2. Other than this discretionary data, Track 1 and Track 2 also contain important data related to the transaction, such as the PAN (Primary Account Number) of the cardholder.

Track 1 and Track 2 are therefore suitable to form the basis of transaction identifiers. Each of Track 1 and Track 2 can be rendered as a transaction identifier by using a suitable hash function so that the transaction identifier is of a suitable size (much smaller than the track data itself) and potentially to provide additional security. A transaction identifier may be provided, for example, by using a SHA256 hash—this provides a 256 bit transaction identifier. Other hash functions may also be used—SHA-384, SHA-512, Keccak (SHA-3) are examples of appropriate hash functions, and there are many other possible choices, as the skilled person will be fully aware. There may be other inputs to the hash function associated with the payment device. The hash function result can be returned by the cardlet to the wallet at the end of the transaction process (the End Event), so at this point the wallet has knowledge of both transaction identifiers.

The track information is also provided by the reader 3 to the terminal 4 along with other information relating to the transaction and necessary for the transaction authorisation process. The terminal 4 has all information necessary to create the transaction identifier, either in data provided by the reader 3 in the course of the transaction or in information already held by the terminal 4 (such as the hash function). The merchant is therefore able to generate (B, 520) the transaction identifiers in the same way as the cardlet does. At this point both the merchant and the cardholder (as represented by the wallet) have both transaction identifiers.

Transaction authorisation takes place according to the relevant process used for the payment infrastructure concerned—in processes set out under payment system rules, the merchant will send the track data in an authorisation request. Consistent handling of this track data in the authorisation process is not mandated by payment system rules—in different implementations, one track, the other tracks or both tracks may be provided by the merchant to the transaction acquirer (transaction acquiring bank 6), or by the transaction acquirer to the payment infrastructure 7. The digital enablement service 17 may therefore receive, directly from the payment infrastructure 7 but indirectly from the merchant (C, 530) Track 1, Track 2, or both tracks. If both tracks are received, it is possible that one track will be generated from the other track, in which case the dynamic information it contains will be incorrect. The digital enablement service 17 can now obtain transaction identifiers from the, or each, track that it receives.

The potential problem with this situation is that no other system element knows which track has been correctly received by the digital enablement service 17. This is addressed by providing, where two tracks have been received, a composite transaction identifier comprising a substantial part of both transaction identifiers. This may be obtained by generating a transaction identifier for each track, truncating each generated transaction identifier to half the size, and concatenating the two truncated transaction identifiers together to form a composite identifier.

The composite identifier is in this case a concatenation of two truncated transaction identifiers. As the truncated transaction identifier is half the length of the normal transaction identifier, the risk that it is not unique is greater. Nonetheless, for practical purposes the truncated transaction identifier may be taken as effectively unique. The probability of a collision is very low—for a 16 byte hash (half the size of a 32 byte SHA-256 hash) the probability of a collision in a dataset of 100 billion transactions is about 1 in $10^{-17}$. As described below, additional safeguards may also be added to reduce risks associated with this smaller hash size.

The digital enablement service 17 is then able to return a single transaction identifier when required. If only one track was received, this is a straightforward hash of that track. If both tracks were received, this is a composite identifier comprising a concatenation of two transaction identifiers (one of which may be incorrect). This will be termed the "DES transaction identifier" below for convenience (DES serving as an abbreviation for digital enablement service).

When authorisation for the transaction has been received by the merchant, the merchant will send data for an electronic receipt (D, 540) to the electronic receipt service 8. It is desirable for customer privacy for the electronic receipt service not to be able to match transaction details with a cardholder account—consequently, the receipt data will not contain data such as a cardholder PAN that can be used to identify a cardholder's transaction receipts. Instead, the electronic receipt data will be provided together with the transaction identifiers for both Track 1 and Track 2. As there are no significant data restrictions on this communication (it is not necessary for real-time authorisation and need not involve the network resources of the payment infrastructure), there is no difficulty in providing both transaction identifiers in this communication.

The cardholder wallet can now obtain transaction (payment) data relating to the transaction from the digital enablement service 17 (E, 550)—this transaction data provides details of the transaction held by the payment infrastructure, but does not comprise an electronic receipt. The transaction data may be pulled from the digital enablement service 17 by the cardholder's computing device 1, or may be pushed to the computing device 1, but in either event the transaction data will be accompanied by the DES transaction identifier, which may (if two tracks were received at the digital enablement service 17) be a composite transaction identifier. At this point, the wallet has the DES transaction identifier and the transaction identifiers originally generated at the cardlet from the Track 1 and Track 2 data.

In order to obtain the receipt and match it with the transaction data, the wallet may send the DES transaction identifier to the electronic receipt service 8 (F, 560). The electronic receipt service cannot itself match the receipt for the transaction with the cardholder, but it can use the transaction identifiers to identify which receipt should be returned to the wallet. The electronic receipt service 8 has the receipt for the transaction stored with both the Track 1 and Track 2 transaction identifiers. The electronic receipt service can then take the DES transaction identifier and split it into two. It can then match the first part of the DES transaction identifier and attempt to match it against the first half of each transaction identifier stored with a receipt to identify the correct transaction. If that does not succeed, this matching process continues by matching the second part of the DES transaction identifier with the first half of each transaction identifier stored with a receipt. When a match is found, the correct receipt (and, optionally, the stored transaction identifiers) may be returned to the wallet, which is then able trivially to reconcile the transaction data, the receipt for the transaction, and all the transaction identifiers together.

There are numerous modifications available to this process flow in alternative embodiments. For example, the process of matching identifiers may take place at the wallet, rather than at the electronic receipt service 8—if the transaction identifiers are matched with the DES transaction identifier at the wallet, then either of the original transaction identifiers can be used to recover the receipt data from the electronic receipt service 8 directly as these original transaction identifiers will be stored together with the receipt for the transaction.

Figure 6:
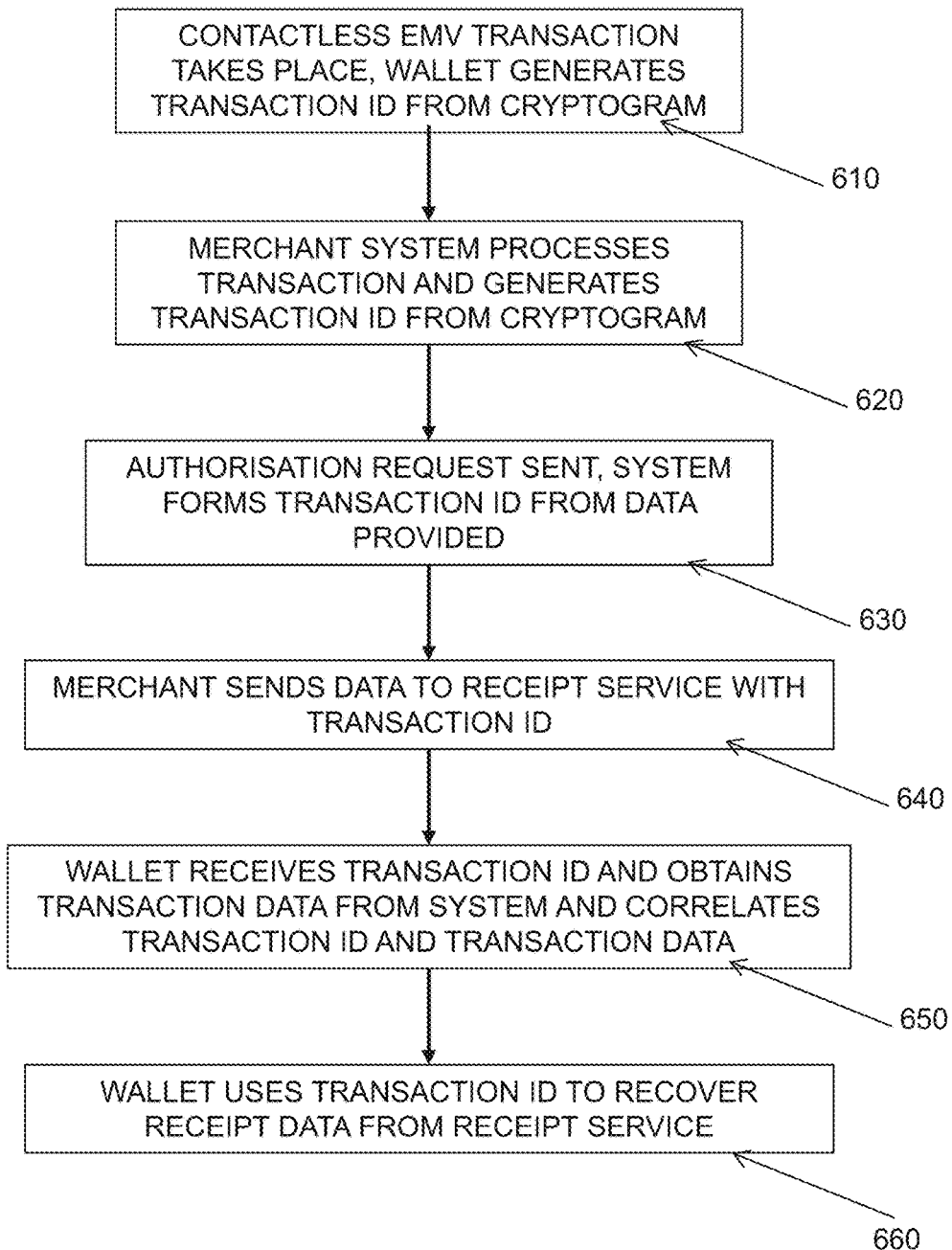
FIG. 6 shows a process flow for an EMV contactless card transaction for comparison.

FIG. 6 shows a process for reconciling electronic receipts with transaction data for contactless EMV transactions—this is described further below, and as can be seen from FIG. 4 and this discussion, is fully consistent with the process used for contactless mag-stripe transactions set out in FIG. 5.

The contactless EMV transaction takes place in a conventional way (A, 610) between the payment device—again implemented on a computing device as a digital wallet and a cardlet, though implementation using a contactless card is also possible as before. The cardlet provides data specified under the EMV Contactless Specifications including an Application Cryptogram (AC)—this is well adapted to form the basis of a transaction identifier. The transaction identifier may be formed, by example, by an SHA256 hash of the AC, the PAN, and possibly a transaction counter. The hash function result can again be returned by the cardlet to the wallet at the end of the transaction process (the End Event), so at this point the wallet has knowledge of the transaction identifier.

The AC is also provided by the reader 3 to the terminal 4 along with other information relating to the transaction and necessary for the transaction authorisation process. The terminal 4 has all information necessary to create the transaction identifier, either in data provided by the reader 3 in the course of the transaction or in information already held by the terminal 4 (such as the hash function). The merchant is therefore able to generate (B, 620) the transaction identifier in the same way as the cardlet does. The merchant and the cardholder (as represented by the wallet) both have the transaction identifier.

Transaction authorisation takes place according to the relevant process used for the payment infrastructure concerned according to EMV standards. This is much more straightforward under EMV, as the data required will be provided in an authorisation request (the DE 55). The digital enablement service 17 will therefore receive, directly from the payment infrastructure 7 but indirectly from the merchant (C, 630), all the information necessary to create the transaction identifier. The DES transaction identifier will therefore be the same as every other version of the transaction identifier.

When authorisation for the transaction has been received by the merchant, the merchant will send data for an electronic receipt (D, 640) to the electronic receipt service 8. As before, the receipt data will not contain data such as a cardholder PAN that can be used to identify a cardholder's transaction receipts. Instead, the electronic receipt data will be provided together with the transaction identifier.

The cardholder wallet can now obtain transaction (payment) data relating to the transaction from the digital enablement service 17 (E, 650). The transaction data may be pulled from the digital enablement service 17 by the cardholder's computing device 1, or may be pushed to the computing device 1, but in either event the transaction data will be accompanied by the DES transaction identifier, which in this case is the same as the transaction identifier held by the wallet. It is therefore straightforward for the wallet send the transaction identifier to the electronic receipt service 8 (F, 660). The electronic receipt service uses the transaction identifier to identify which receipt should be returned to the wallet. When a match is found, the correct receipt (and, optionally, the stored transaction identifiers) is as before returned to the wallet, which reconciles the transaction data, the receipt for the transaction, and the transaction identifier together.

While the embodiments described in detail above relate to contactless transactions with a payment device, embodiments of the disclosure may be provided in other contexts. When a transaction of any kind—such as a security clearance to enter a building—may involve one of a plurality of user credentials, then it may be desirable to form a transaction identifier out of each credential that may be passed to a unifying system. A composite transaction identifier may then be created as described by the unifying system to allow comparison of the transaction identifier from the used credential with the composite transaction identifier. This may be used to allow, for example, access logs of access by a user to a number of assets potentially by use of different credentials to be created by the controller of the assets, but without transmission of the credentials themselves to the controller of the assets in such a way that could violate or compromise the user's privacy. In this way embodiments of the disclosure may be used for permissions to enter secured facilities, or for use of a composite transit system with multiple ticketing arrangements.

The invention claimed is:

1. A method of matching transaction data with a transaction receipt using one of a plurality of transaction-specific elements, the method comprising:

determining from a transaction between a payment token and a terminal a plurality of transaction-specific elements, and forming a plurality of transaction identifiers each from a separate transaction-specific element;

receiving or generating, by a transaction processing system, at least one of the plurality of transaction identifiers, wherein the transaction processing system provides transaction data associated with said at least one of the plurality of transaction identifiers;

truncating each of the plurality of transaction identifiers used by the transaction processing system, wherein each transaction identifier element is a truncated transaction identifier;

concatenating, by the transaction processing system, the transaction identifier elements together to form a composite transaction identifier including a plurality of transaction identifier elements; and transmitting, by the transaction processing system, the composite transaction identifier to an entity that performs a matching operation on each transaction identifier against each transaction identifier element to identify the transaction and to associate the transaction data with a transaction receipt.

2. The method as claimed in claim 1, wherein each transaction identifier comprises an output of a hash function, wherein the transaction-specific element is an input to the hash function.

3. The method as claimed in claim 2, wherein the hash function is an SHA256 hash function.

4. The method as claimed in claim 1, wherein the terminal provides the at least one of the plurality of transaction-specific elements to a transaction processing system.

5. The method as claimed in claim 1, wherein the transaction processing system forms the composite transaction identifier and transmits the composite transaction identifier to a user or to a receipt service.

6. The method as claimed in claim 1, wherein a, or the, user has a payment device and the terminal is a merchant device.

7. The method as claimed in claim 6, wherein the payment device is, or emulates, a contactless payment card.

8. The method as claimed in claim 7, wherein the payment device is, or emulates, a contactless mag-stripe card.

* * * * *